(12) United States Patent
Cobb

(10) Patent No.: US 6,397,448 B1
(45) Date of Patent: Jun. 4, 2002

(54) METHOD OF MOUNTING ALIGNED SUSPENSION ASSEMBLIES FOR HEAVY-DUTY TRAILERS

(75) Inventor: Bruce V. Cobb, Livonia, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 52 days.

(21) Appl. No.: 09/664,806

(22) Filed: Sep. 19, 2000

(51) Int. Cl.[7] .............................................. B23Q 17/00
(52) U.S. Cl. ................ 29/407.05; 29/407.01; 29/407.09; 29/407.1; 33/286
(58) Field of Search ........................ 29/407.01, 407.04, 29/407.05, 407.09, 407.1, 720; 33/293, 282, 284, 286, DIG. 21

(56) References Cited

U.S. PATENT DOCUMENTS

| | | | | |
|---|---|---|---|---|
| 5,144,487 A | * | 9/1992 | Hersey | 356/138 |
| 5,207,002 A | * | 5/1993 | Humbiet | 33/288 |
| 6,023,337 A | * | 2/2000 | Schiff | 356/400 |
| 6,202,312 B1 | * | 3/2001 | Rando | 33/286 |

* cited by examiner

Primary Examiner—S. Thomas Hughes
Assistant Examiner—Jermie E. Cozart
(74) Attorney, Agent, or Firm—Carlson, Gaskey & Olds

(57) ABSTRACT

Suspensions for a heavy-duty trailer are mounted by first locating parallel and equidistantly-spaced mounting points. A laser apparatus, including a laser source, laser targets, and laser beam diverters, is utilized to locate and mark the mounting points along an undercarriage frame of the trailer such that the suspensions, when mounted, are aligned and the ride characteristics of the heavy-duty trailer are optimized.

8 Claims, 3 Drawing Sheets

METHOD OF MOUNTING ALIGNED SUSPENSION ASSEMBLIES FOR HEAVY-DUTY TRAILERS

BACKGROUND OF THE INVENTION

The subject invention relates to a method of locating parallel mounting points for a suspension support assembly to mount a suspension by using a laser.

For structural support, heavy-duty trailers have an undercarriage frame. The undercarriage frame includes steel support beams, or ribs, that extend both laterally and longitudinally between a front and back of the trailer. Suspensions are mounted to the trailers via suspension support assemblies to provide enhanced riding performance.

One type of heavy-duty trailer utilizes slider-suspensions. For this type of trailer, the suspension support assembly is a pair of suspension guide rails that extend longitudinally between the front and back of the trailer. The suspension guide rails are mounted to the steel support beams of the undercarriage frame first by a two-point tack welding process at mounting points, and then by permanent welding the guide rails to the remaining support beams. The slider-suspension is mounted to slide within the guide rails of the suspension support assembly. An alternative heavy-duty trailer utilizes non-slider suspension. In this type of trailer, the suspension support assembly has first and second support flanges extending from the undercarriage frame of the trailer. The non-slider suspension is mounted to the support flanges at mounting points. In either situation, proper geometric and parallel relationships between the mounting points for the guide rails, and between the mounting points on the support flanges for the non-slider suspension, are critical. For purposes of the application, both the guide rails and the support flanges will be referred to generically as "support rails".

Generally, the prior art has used manual measurement to try and align the rails. This has sometimes resulted in misalignment. Support rails are frequently misaligned. That is, the rails do not extend between the front and back of the trailer parallel to and equidistant from one another. If the support rails are misaligned then the suspension will be misaligned. Misaligned suspensions contribute to excessive tire wear and continuous maintenance.

It would be desirable to introduce a method that locates parallel mounting points for the suspension guide rails and on the suspension support flanges of a heavy-duty trailer to mount aligned suspensions.

SUMMARY OF THE INVENTION AND ADVANTAGES

A method of locating parallel mounting points of a suspension support assembly for mounting an aligned suspension on an undercarriage of a heavy-duty trailer is disclosed. The method of the subject invention can be applied to both slider-suspensions and non-slider suspensions.

Generally, a first mounting point is selected. The first mounting point can be measured from a referenced surface on the trailer. A laser is mounted adjacent to trailer, and is mounted in a way such that it extends at a predetermined angle relative to the trailer. In one preferred embodiment, if the rails are to extend longitudinal, the laser is mounted such that it is directing its beam perpendicular to a lateral axis of the trailer, such that it defines a longitudinal axis. The laser is passed through a target located on the first selected point. This then defines a first line. The second point can be measured from the first point along this line. Once the first and second points are defined, one will know that the particular rail mounted to the first and second points is properly mounted and will extend directly along the longitudinal axis. This alone may be sufficient for achieving the elimination of much of the misalignment in the prior art.

However, in additional steps, some beam deflecting system is utilized such that the beam extending along the first line is deflected perpendicularly to the first line. The beam is preferably deflected at one of the two points, and a worker can measure along the deflected line for the predetermined distance between the two rails. Since the deflected beam is perpendicular to the first beam, the worker can be assured that by locating this third reference point for the second rail along the deflected beam, a point that is properly located relative to the first line will be achieved.

At that point, in any one of several fashions a second line is defined extending through the third point. The fourth point may then be selected spaced by the required distance from the third point. The second rail be then mounted to the third and fourth point.

In embodiments of this invention, laser targets having reception ports, deflecting structure, etc. are utilized to deflect the laser as required.

The method can be utilized for either a trailer having a slider-suspension, or a trailer having a non-slider suspension. As mentioned above, in a trailer utilizing a slider-suspension, the support rails which are located are guide rails. In a trailer utilizing a non-slider suspension, the suspension is being mounted on the support flanges.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
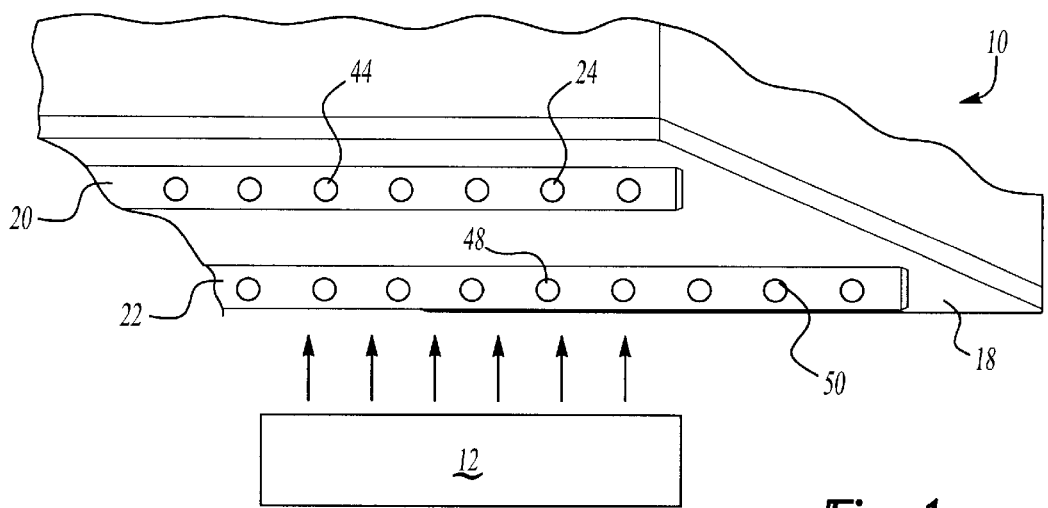
FIG. 1 is a perspective view of an undercarriage frame of a trailer having first and second suspension guide rails and a slider-suspension mountable within the guide rails.
Figure 2A:
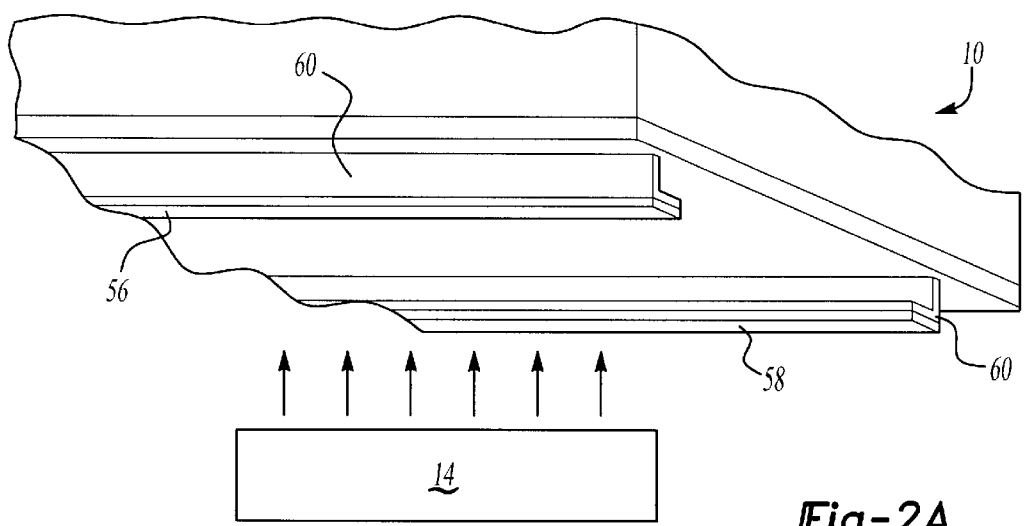
FIG. 2A is a perspective view of the undercarriage frame of the trailer having first and second support flanges extending from the undercarriage frame for supporting a non-slider suspension.
Figure 2B:
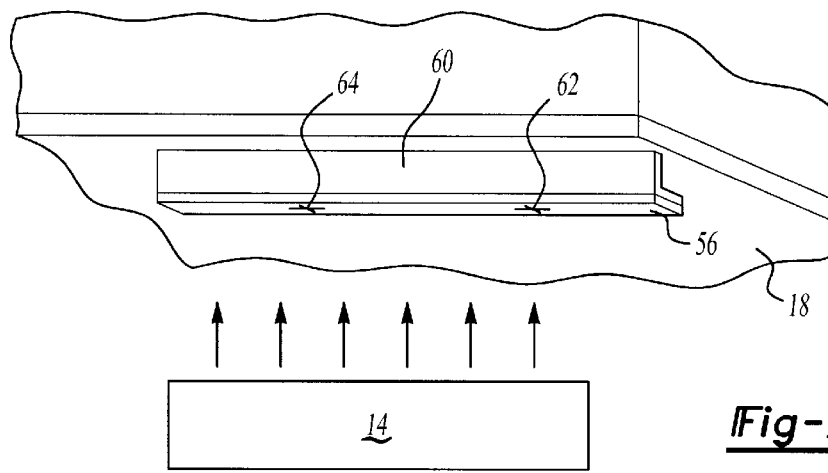
FIG. 2B is an enlarged perspective view of the undercarriage frame and the first support flange for the non-slider suspension as illustrated in FIG. 2A.

Referring to the Figures, a method of locating parallel mounting points of a suspension support assembly for a heavy-duty trailer 10 is disclosed. The method locates parallel mounting points for the suspension support assemblies of trailers 10 utilizing slider-suspensions 12, as shown in FIG. 1, and non-slider suspensions 14, as shown in FIGS. 2A and 2B. By first locating the parallel mounting points for the suspension support assembly, the subject invention enables a manufacturer of heavy-duty trailers 10 to mount the suspension, either the slider-suspension 12 or the non-slider suspension 14, in an aligned manner. It is to be understood that the suspensions 12, 14 are represented highly schematically in FIGS. 1A, 2A and 2B.

Figure 3:
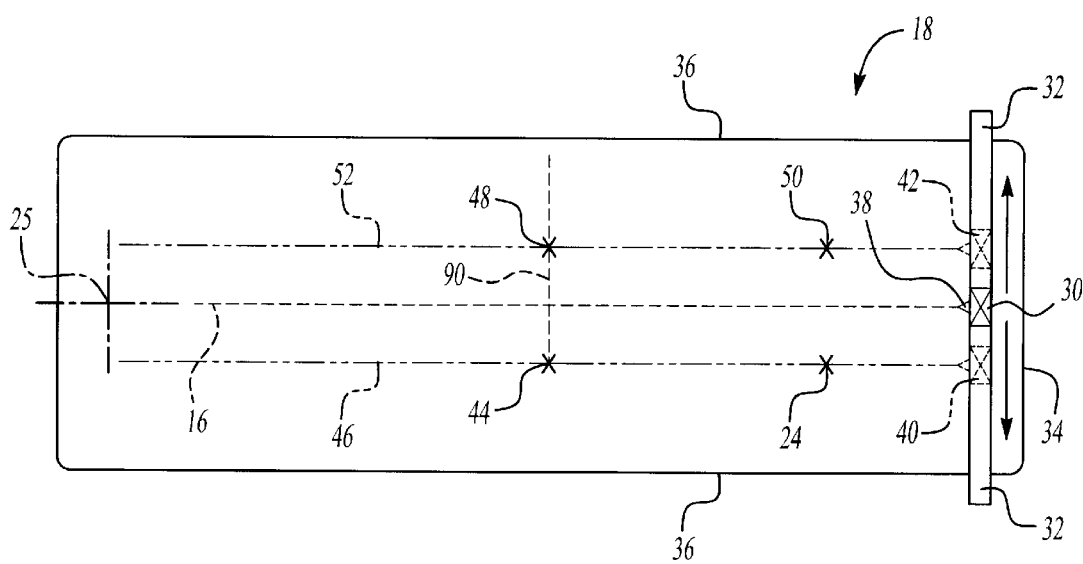
FIG. 3 is a schematic representation of the undercarriage frame of the trailer illustrating first and second parallel lines and the relationship between the mounting points for the suspension guide rails and a pivot point of the trailer.
Figure 4:
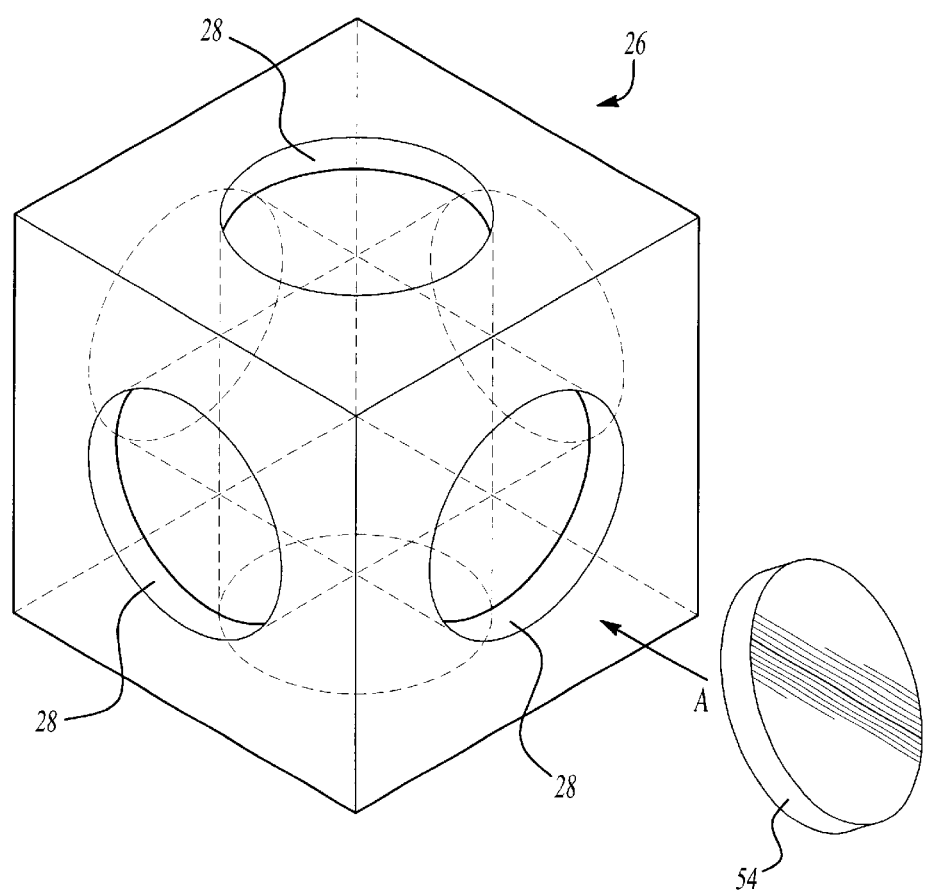
FIG. 4 is a perspective view of a laser target having reception ports utilized in the subject invention.

Referring to the slider-suspension 12 disclosed in FIG. 1, first and second suspension guide rails 20, 22 are spaced laterally across trailer 10 and operate as the suspension support assembly for the slider-suspension 12. The method of this invention will now be explained with reference to FIG. 3. A first mounting point 24 for the first suspension guide rail 20 is located on the undercarriage frame 18 of the trailer 10. That is, the manufacturer predetermines the location of the first mounting point 24 depending on factors including, but not limited to, the dimensions of the particular trailer, the desired ride characteristics, and the desired location for the slider-suspension. The manufacturer measures to locate the first mounting point 24 from a fixed point such as a front or back end of the trailer 10, a pivot point or trailer kingpin 25 of the trailer 10. Next, a first laser target 26 having a reception port 28, as shown in FIG. 4, is mounted at the first mounting point 24. The laser target is preferably a magnetic, three-dimensional cube that can be magnetically mounted to the undercarriage frame 18 of the trailer 10. Further, the laser target 26 preferably has more than one reception port 28. The function of the reception ports 28 will be described further hereinbelow.

A laser source 30 capable of projecting a laser beam 38 is appropriately aligned and adjacent the undercarriage frame 18 of the trailer 10. Preferably, the laser source 30 is mounted on a support beam 32 that is parallel to a back end 34 of trailer 34. The support beam 32 may be positioned to have equal lengths of the beam 32 extending from sides 36 of the undercarriage frame 18. As such, the beam 32 and the laser source 30 supported by the beam 32 are centered relative to the undercarriage frame 10. The support beam 32 is preferably telescoping such that the beam 32 can be extended to apply to trailers of varying widths. The laser source 30 is mounted on the support beam 32 such that any laser beam 38 from the laser source 30 projects perpendicularly to the support beam 32. As such, the laser beam 38 projects parallel to a length of the trailer 10. As represented by the arrows in FIG. 3, the laser source 30 is movable on the support beam 32 so that the beam 38 from the laser source 30 can be projected along any length of the trailer 10. The movement of the laser source 30 is represented in phantom at 40 and 42. Since the laser source 30 is movable on the support beam 32, the beam 32 incorporates a locking mechanism to temporarily lock the laser source 30 in a proper position after the laser source 30 has been adjusted. Although not shown, the support beam 32 can incorporate a plurality of laser sources 30 such that movement of the laser source 30 on the support beam 32 is not required.

After the first laser target 26 is mounted on point 24, the laser source 30 is aligned to be projected through the reception port 28 of the first laser target 26. With the beam 38 projecting through the reception port 28 of the first laser target 26, the first mounting point 24 is marked on the undercarriage frame 18. Preferably, the manufacturer utilizes one of the reception ports 28 in the first laser target 26 to insert a punch apparatus and physically mark the undercarriage frame 18.

The laser passes through the target to define line 46 along trailer 10. The manufacturer next locates a second mounting point 44 for the first suspension guide rail 20. To locate the second mounting point 44, the manufacturer measures a predetermined distance from the first mounting point 24 along line 46. As such, the second mounting point 44 is spaced along first line 46 at the predetermined distance along the undercarriage frame 18. This assures the points 24 and 44 are properly aligned.

In one embodiment, a second laser target 26 is then mounted, preferably magnetically, at the second mounting point 44. For descriptive purposes only, the second laser target 26 will be numbered the same as the first laser target 26 as shown in FIG. 4. The second laser target 26 also has a reception port 28 such that the laser beam 38 projecting through the first laser target 26 also projects through the second laser target 26. The second mounting point 44 is marked on the undercarriage frame 18 in the same manner used to mark the first mounting point 24.

With the first and second mounting points 24, 44 marked, the first suspension guide rail 20 may be mounted to the undercarriage frame 18 of the trailer 10 at the first and second mounting points 24, 44. More specifically, the first suspension guide rail 20 is preferably mounted to the undercarriage frame 18 of the trailer 10 first by a two-point tack welding process at the first and second mounting points 24, 44, and then by a permanent welding process that affixes the remainder of the guide rail 20 to the undercarriage frame 18. Of course, the first suspension guide rail 20 can be fixed to the undercarriage frame 18 of the trailer 10 by methods other than welding including, but not limited to, nut and bolt assembly.

Third and fourth mounting points 48, 50 are then located along a second line 52 parallel to the first line 46. As represented by Arrow A in FIG. 4, in one embodiment, a beam diverter 54 is inserted into a center of the reception ports 28 of the second laser target 26. The details of such structures are known, and need not be disclosed here. Preferably, the beam diverter 54 is an optical device, such as a mirror, inserted at a 45 degree angle into the center of the reception ports 28 to deflect the incoming laser beam 38 from the second laser target 26 and project the beam 38 perpendicularly to the first suspension guide rail 20 and the first line 46 such as shown at 90.

The third mounting point 48 for the second suspension guide rail 22 is then located. To locate the third mounting point 48, the manufacturer measures a predetermined distance along line 90 on the undercarriage frame 18 from the second mounting point 44. The third mounting point 48 is marked on the undercarriage frame 18 as described above in reference to the first and second mounting points 24, 44.

To locate the fourth mounting point 50 for the second suspension guide rail 22 there are several options. First, one may insert a beam diverter 54 into either the first laser target 26 at the first mounting point 24 or into a third laser target 26 at a third mounting point 48. The beam diverter 54 utilized can be the same beam diverter 54 used previously or a separate beam diverter. If the diverter 54 is inserted into the first laser target 26 at the first mounting point 24, then the beam 38 is diverted and projected from the first laser target 26 perpendicularly to the first suspension guide rail 20 and the first line 46 similar to line 90. The fourth point can then be set by measuring along this line. Alternatively, the diverter 54 can be inserted into a third laser target 26 at the third mounting point 48. The beam 38 is diverted and projected from the third laser target 26 parallel to the first suspension guide rail 20 and the first line 46 along line 52. The fourth mounting point 50 is then located by measuring from point 48 along line 52. A fourth laser target 26 having a reception port 28 may then be mounted at the fourth mounting point 50 such that the diverted beam 38 projects through the fourth target 26. The fourth mounting point 50 is marked on the undercarriage frame 18 as described above in reference to the first, second, and third mounting points 24, 44, 48.

With the third and fourth mounting points 48, 50 marked, the second suspension guide rail 22 is mounted to the undercarriage frame 18 of the trailer 10 at the third and fourth mounting points 48, 50. The second guide rail 22 is mounted to the undercarriage frame 18 of the trailer 10 as described above with reference to the welding of the first suspension guide rail 20.

It is to be understood that the first and second guide rails 20, 22 can be mounted simultaneously after all four mounting points 24, 44, 48, 50 are located and marked. In such a case, the manufacturer can, prior to mounting of the guide rails 20, 22, verify that the mounting points 24, 44, 48, 50 are equidistant from the center line 16 of the undercarriage frame 18 of the trailer 10. The laser source 30 is utilized by the manufacturer to project the laser beam 38 along a centerline 16 between the mounting points 24, 44, 48, 50 and parallel to the first and second lines 46, 52 to the pivot point 25 of the trailer 10. More specifically, the laser source 30 is centered on the support beam 32 to project the laser beam 38 at the pivot point 25 of the trailer 10. The centerline 16 is now defined between the laser source 30 and the pivot point 25. One can now verify that the mounting points 24, 44, 48, 50 are spaced substantially equidistant from the center line 16.

In diverting the laser beam 38 from the first line 46 to begin the process of locating the third and fourth mounting points 48, 50, the manufacturer has several options as represented schematically in FIGS. 5 through 8.

Figure 5:
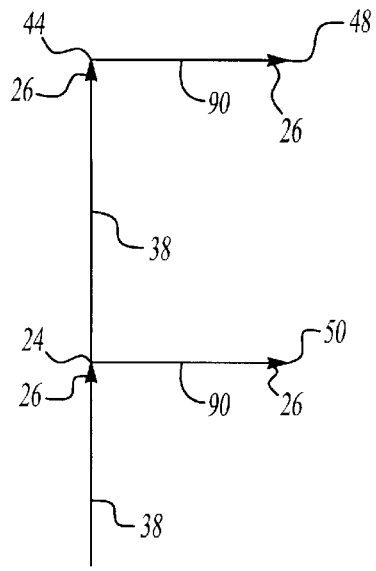
FIG. 5 is a schematic diagram representing steps of locating third and fourth mounting points for the second suspension guide rail.

With reference first to FIG. 5, to begin locating the third and fourth mounting points 48, 50 beam diverters 54 are mounted at points 24 and 34. As described above, the third mounting point 48 is located by measuring a predetermined distance on the undercarriage frame 18 from the second mounting point 44. The fourth mounting point 50 is located by measuring the predetermined distance on the undercarriage frame 18 from the first mount point 24.

Figure 6:
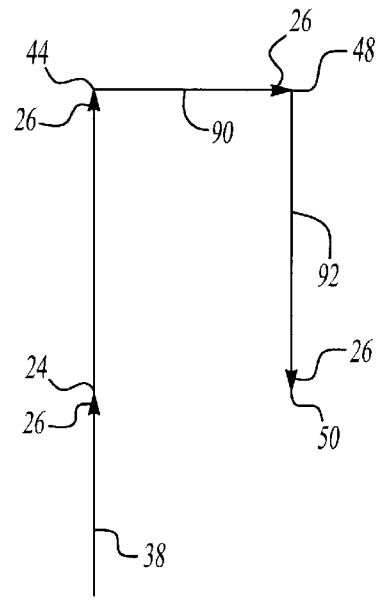
FIG. 6 is a schematic diagram representing alternative steps of locating the third and fourth mounting points.

With reference to FIG. 6, the third and fourth mounting points 48, 50 are located by an alternative method. Beam diverters 54 are inserted at second mounting point 44 to project the beam perpendicularly to the first suspension guide rail 20. Another beam diverter 54 is mounted at the third mounting point 48. The fourth mounting point 50 is then located by measuring the predetermined distance on the undercarriage frame 18 from the third mounting point 48, along line 92.

Figure 7:
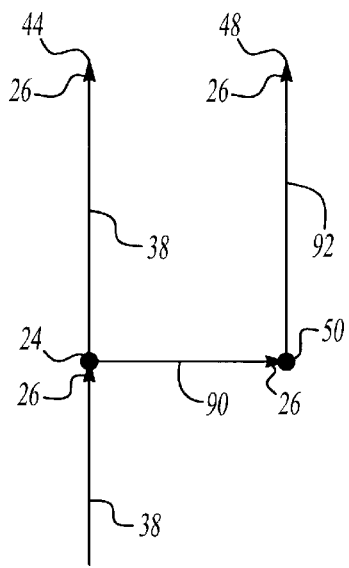
FIG. 7 is a schematic diagram representing further alternative steps of locating the third and fourth mounting points.

With reference to FIG. 7, the third and fourth mounting points 48, 50 are located effectively in the reverse method of the FIG. 6 embodiment.

Figure 8:
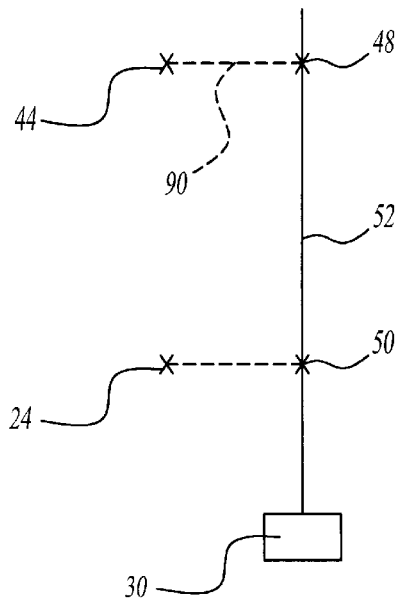
FIG. 8 shows another embodiment of the subject invention.

As shown in FIG. 8, once the line 90 has been defined from the line 46, and the third point 48 has been set, the fourth point 50 can be set by moving the laser source 30 such that the beam defines the line 52. One may then define the fourth point 50 by measuring along the line 52 from the point 48. While the embodiment has been illustrated defining the point 48 and then measuring to the point 50, as is the case between FIGS. 6 and 7, the reverse can also be true. Further, while the points 24 and 44 are defined as first and second and the points 48 and 50 are defined as third and fourth for this disclosure, it should be understood that with reference to the claims, the point 44 could be set prior to the point 24, and the point 50 could be set prior to the point 48.

Referring now to the non-slider suspension 14 disclosed in FIGS. 2A and 2B, first and second support flanges 56, 58 operate as the suspension support assembly and extend from mounting brackets 60 fixed to the undercarriage frame 18 of the trailer 10 to support the non-slider suspension 14. The method of fixing the points is the same as that introduced and described above with one exception. In this alternative embodiment of the subject invention, the mounting points 62, 64 are located directly on, and the laser targets 26 are therefore mounted directly to, the support flange 56 as opposed to directly on the undercarriage frame 18. This distinction is minor considering that the support flanges 56, 58 are an extension of the undercarriage frame 18. The first and second mounting points 62, 64 are associated with the first support flange 56 to support one end of the non-slider suspension 14, and the third and fourth mounting points are associated with the second support flange 58 to support the other end of the non-slider suspension 14. Once the laser targets 26 have been used, and the mounting points 62, 64 have been marked, the non-slider suspension 14 is mounted to the parallel mounting points 62, 64 on the support flange 56 such that the suspension 14 is automatically aligned.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method of locating parallel mounting points of a suspension support assembly for mounting an aligned suspension on a trailer, said method comprising the steps of:

selecting a first mounting point on the trailer;

projecting a beam of a laser source along the trailer and through the first mounting point to define a first line;

locating a second mounting point spaced along a first line from the first mounting point;

diverting the beam perpendicularly from the first line to locate third and fourth mounting points spaced along a second line parallel to the first line; and mounting a first suspension rail to the first and second mounting points, and mounting a second suspension rail to the third and fourth mounting points such that the second rail is parallel to the first rail and the suspension mounted to the first and second rails is aligned.

2. A method as set forth in claim 1 further including the step of projecting a laser beam between and parallel to the first and second lines to a reference point of the trailer thereby defining a center line, and measuring to ensure the mounting points are spaced along the first and second lines substantially equidistant from the center line.

3. A method as set forth in claim 2 wherein the step of diverting the beam perpendicularly from the first line to locate the third and fourth mounting points further includes the step of inserting a beam diverter into a reception port of a laser target mounted on one of said first and second mounting points to divert the beam and project the beam perpendicularly to the first line.

4. A method as set forth in claim 3 including the step of locating a third mounting point for the second suspension rail at a predetermined distance on the undercarriage frame from one of said first and second mounting points.

5. A method as set forth in claim 4 including the step of locating a fourth mounting point for the second suspension rail by inserting a beam diverter into a reception port of a laser target mounted to the other of said first and second mounting points, and projecting the beam perpendicularly to the first line, and measuring from the other of said first and second mounting points a predetermined distance along said diverted beam to locate said fourth mounting point.

6. A method as set forth in claim 4 including the step of inserting a beam diverter into a reception port of a laser target on said third mounting point to divert the beam from said laser target and project the beam parallel to the first suspension guide rail to define a second line.

7. A method as set forth in claim 6 including the step of locating the fourth mounting point for the second suspension guide rail at a predetermined distance on the undercarriage frame from the third mounting point along said second line.

8. A method is set forth in claim 4 wherein a laser source is directed through said third mounting point generally parallel to said first line to define a second line, and said fourth mounting point is identified by measuring along said second line from said third mounting point.

* * * * *